INVENTORS
JOHN L. MAURER and
JAMES WILLARD DAVIDSON
BY
Oberlin, Maky & Donnelly
ATTORNEYS July 25, 1967 J. L. MAURER ETAL 3,333,036
MANDREL FREE METHOD FOR FORMING A CORRUGATED HOSE
Filed Nov. 27, 1962 3 Sheets-Sheet 2

INVENTORS
JOHN L. MAURER and
JAMES WILLARD DAVIDSON
BY
Oberlin, Maky & Donnelly
ATTORNEYS July 25, 1967    J. L. MAURER ETAL    3,333,036
MANDREL FREE METHOD FOR FORMING A CORRUGATED HOSE
Filed Nov. 27, 1962    3 Sheets-Sheet 3

INVENTORS
JOHN L. MAURER and
JAMES WILLARD DAVIDSON
BY
Oberlin, Maky & Donnelly
ATTORNEYS United States Patent Office 3,333,036
Patented July 25, 1967

3,333,036
MANDREL FREE METHOD FOR FORMING A CORRUGATED HOSE
John L. Maurer, North Madison, and James Willard Davidson, Willoughby, Ohio, assignors to The Eagle-Picher Company, Cincinnati, Ohio, a corporation of Ohio
Filed Nov. 27, 1962, Ser. No. 240,363
4 Claims. (Cl. 264—94)

The present invention relates to shaping a hollow section of moldable plastic material and, more particularly, to mandrel-free method and apparatus for shaping, such as corrugating, a moldable tube in such a manner as to provide a medial portion of the tube having a wall section that is thinner than a terminal portion.

Although the present invention encompasses various shaping operations for a hollow section of a moldable material, the invention is particularly useful in corrugating a vulcanizable rubber tube. Accordingly, for convenience of disclosure, this shaping operation is referred to in some detail. Heretofore, the practice of corrugating a rubber tube has included the use of a mandrel which telescopically receives the tube during the shaping or corrugating step. A mandrel was considered necessary to support the uncured or unvulcanized material until the material obtained sufficient rigidity to be self-supporting. A mandrel, however, complicates the apparatus used and prolongs the molding operation in that each section of the moldable material must, at some point in the process, be individually placed about the mandrel. Also, a mandrel generally restricts the length of the tube up to the length of the mandrel, so that a variety of mandrels are usually required to meet diverse mandrels in a finished vulcanized tube.

The present invention obviates the need for a mandrel in the initial shaping or forming step to which the material which is to be shaped is subjected. Further, the invention provides a shaped tube or the like having a thicker wall section at a terminal, where the wear and strain are the greatest, than at a medial portion of the tube.

It is, therefore, a principal object to provide an improved method for shaping a hollow section of moldable plastic material.

Another object is to provide such a method which does not require a mandrel to support the section during a shaping or pre-creasing step.

A further object is to provide a method of forming a hollow body having a terminal portion of greater wall thickness than a medial portion of the same body.

Other objects of the invention will become apparent as the description proceeds.

To the accomplishment of the foregoing and related ends, the invention consists of the features hereinafter fully described and particularly pointed out in the claims, the annexed drawing and following disclosure describing in detail the invention, such drawing and disclosure illustrating, however, but one or more of the various ways in which the invention may be practiced.

*General description*

Figure 2:
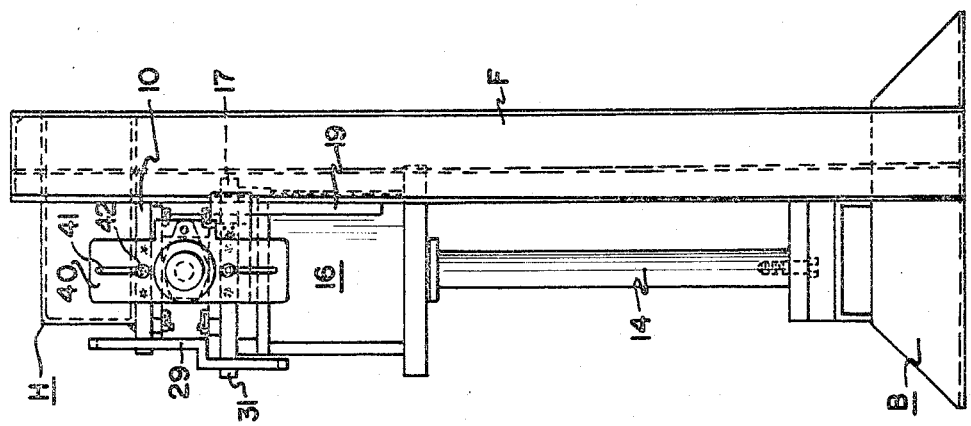
FIGURES 1 and 2 are frone and side elevational views, respectively, of one form of the present apparatus.
Figure 1:
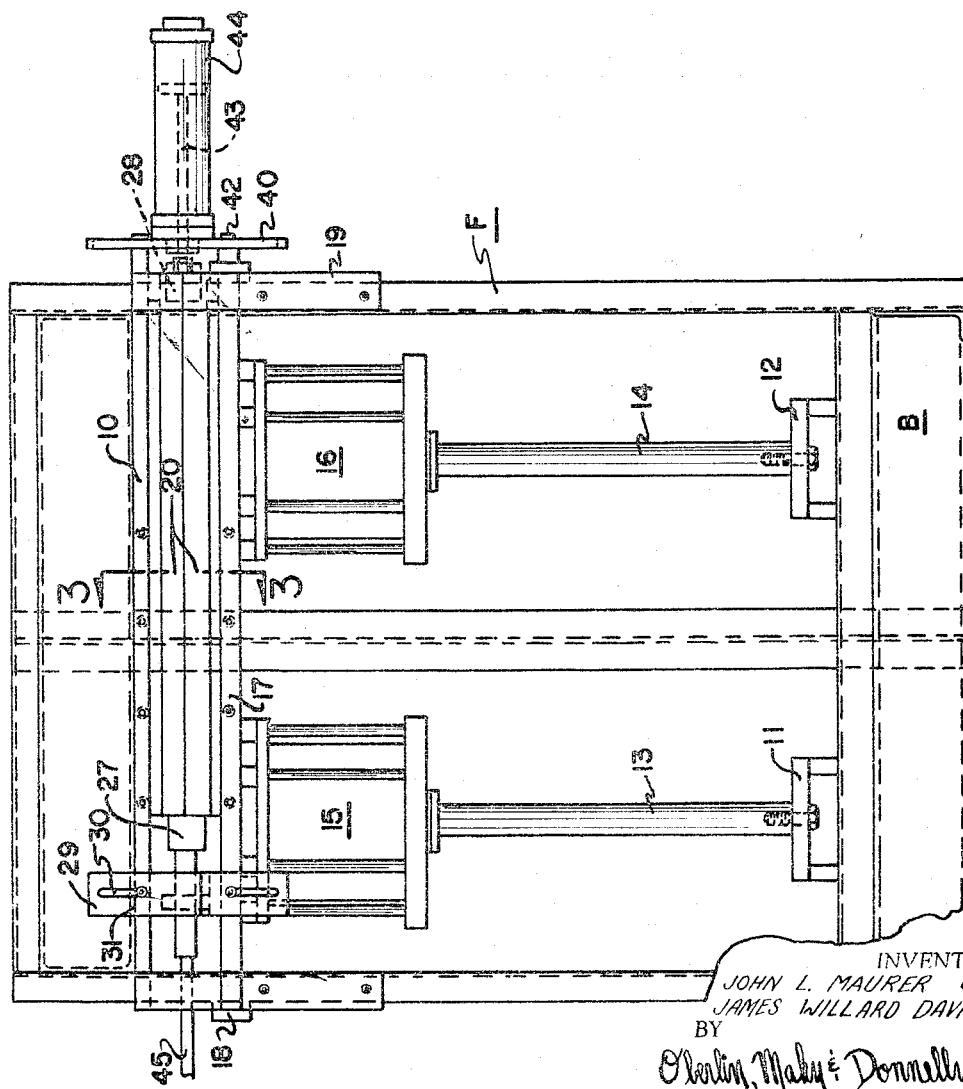

Instead of a mandrel which telescopically receives a hollow moldable section, such as in the form of a tube, clamping or gripping means are used in the present invention to engage the ends of the tube. The tube or like workpiece is otherwise unsupported. In one form, the clamps or other means move axially with respect to each other beyond the travel of mold sections traversed by the sections upon closing by the tube to mold it as desired. Usually fluid under pressure enters the tube and forces it against the mold walls to effect the molding operation.

In the case of forming a corrugated hose or the like, the mold sections form axially-spaced circumferential creases in the tube. Upon reopening the mold, the tube is axially compressed by folding it along the precreases. Finally, the tube is cured or vulcanized in the axially compressed state.

Certain advantages result from this omission of a mandrel. The end portions of the tube or like hollow workpieces that are gripped by the clamps retain their original thickness or gauge throughout the operation. When the clamps move apart, the tube is brought into linear alignment and may also be stretched along its medial portion so as to reduce the wall thickness. When the tube is expanded as by compressed air, there may be a further reduction in the wall thickness of the medial portion of the tube. Or, as a further modification, successive reductions in wall thickness of the medial portion by both of these techniques may be obtained.

The net result is that for a given weight of raw stock it is possible to obtain a longer hose still having ends or terminals of a requisite thickness. Or the same length of hose may be realized as under prior techniques but having thicker end collars. The obtaining of thicker ends by either route is significant because the severest wear on a tube, and especially a corrugated tube, is at the very ends where the tube is tightly held after installation.

A still further advantage resulting from the present invention is the omission of a trimming operation on the finished product. Because the ends of the tube can initially be cut as desired from the raw stock and are cured or vulcanized in this desired shape, the desired configuration of the hose terminals are formed automatically. It is accordingly not necessary to trim the finally produced hose or tube as is now customarily the practice.

*Apparatus*

Referring particularly to FIGURES 1 through 5, the form of the apparatus illustrated includes a frame generally indicated at F having a horizontally disposed overhang H to which is suitably secured a stationary bedplate 10. Along the base B of the frame, a pair of U-shaped platforms 11 and 12, integral with the frame, have the terminals of piston rods 13 and 14, respectively, fixed thereto. Fluid actuated cylinders 15 and 16 receive the piston rods at their lower ends and are fixed at their upper ends to a movable bedplate 17. The latter has U-shaped riders 18 at each end which during vertical reciprocation of the bedplate 17 by the cylinders 15 and 16 slidingly grip rider plates 19 fixed at the sides of the frame F.

Figure 3:
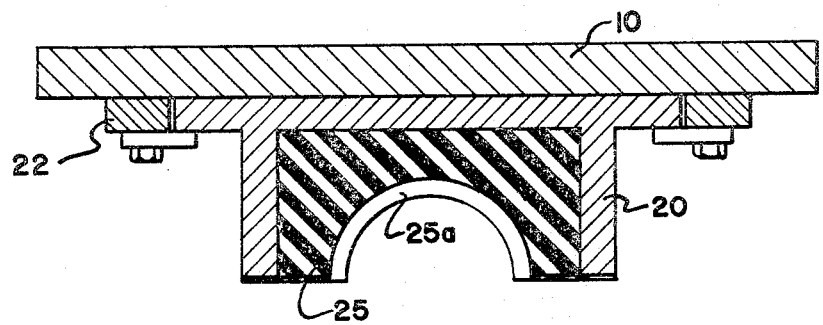
FIGURE 3 is a section of FIGURE 1 on the line 3—3 but illustrates the mold parts in open position.
Figure 3:
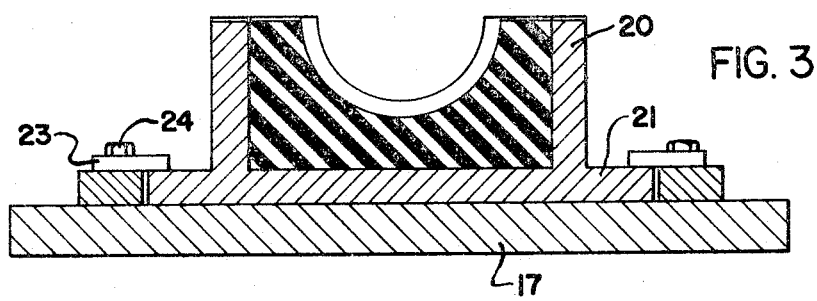
Figure 4:
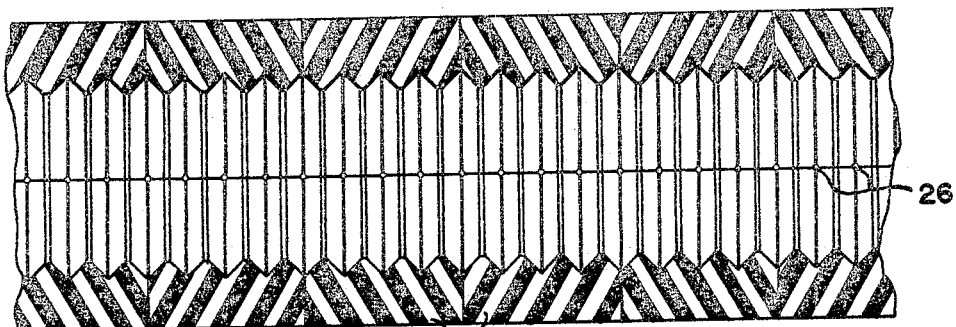
FIGURE 4 is a bottom plan view of FIGURE 3 on the line 4—4.

FIGURES 3 and 4 illustrate the relation between and structure of the stationary bedplate 10 and the movable bedplate 17 and attendant mold parts. Each bedplate has a channel 20 having laterally projecting flanges 21 contacting a bedplate. Strips 22 suitably fixed to a bedplate as by welding extend along the flanges 21. Hold-down lugs 23 and bolts 24 tightly contact the flanges 21 to lock each channel 20 at a desired location on a bedplate. This arrangement also permits adjustment in all horizontal directions as may be desired.

The actual molding implements are held within the channels 20. In the case of molding a corrugated tube, the shaping implements include a series of solid, hard, elastic rubber segments 25, each segment having a plurality of semicircular ridges 25a. The segments 25 are aligned (FIGURE 4) for a desired length along each bedplate 10 and 17. The use of stacked segments as illustrated permits bleeding of air from the mold between such segments during a molding operation. For this purpose also, the roots or valleys between each convolution 25a may have a bleed hole 26. Normally, the segments 25 of the two bedplates are vertically aligned, so that closing the two mold sections uniformly creases a tube circumferentially at axially spaced points. Instead of spaced creases, a spiraling crease or still other configurations can obviously be employed.

A pair of clamps or chucks 27 and 28 are stationed at opposite ends of the cooperating bedplates 10 and 17. When the mold parts are closed, the overall vertical width is not very great. Accordingly, in order to provide for an operator sufficient room in which to load and unload the apparatus, means are included to permit vertical travel of the clamps 27 and 28 so that these clamps have a "floating" relation between the closing mold sections. In this way, the clamps are not clamped near either mold section and, in fact, occupy a vertical position midway of the mold parts when they are in an open station.

Figure 5:
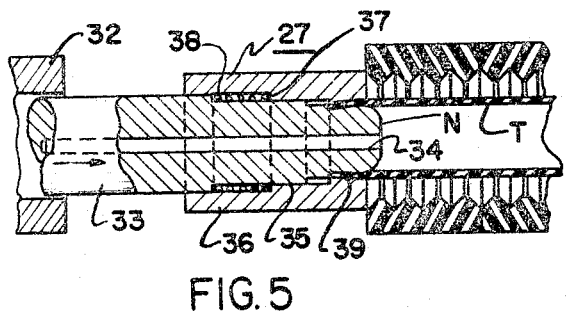
FIGURE 5 is a fragmentary longitudinal section of the left-hand clamp or chuck, as viewed in FIGURE 1, used to grip an end of a hollow section to be shaped.

More particularly, with respect to clamp 27, a slide plate 29 which may be offset (FIGURE 2), has longitudinally disposed slots 30 that freely engage pins 31 on both bedplates 10 and 17. Heads on the pins retain the plate 29 in assembly. The plate 29 carries a fixed block 32 which in turn has an opening to receive and support a rod 33 forming part of the clamp 27 (FIGURE 5). The rod 33 has a longitudinal bore 34 to admit fluid, as hereinafter described, and terminates in a reduced portion 35 of smaller diameter having a rounded nose N of still smaller diameter. An annular sleeve 36 fits about this rod terminus and has a shoulder 37 to form in cooperation with the reduced portion of the rod an annular housing for a coiled spring 38. The sleeve 27 also has an inwardly extending lip 39 which cooperates with the nose N to grip therebetween the end of a tube T or other like workpiece.

A second slide plate 40 supports the clamp 28. This slide plate also has longitudinally disposed slots 41 freely engaging headed pins 42 on both of the bedplates 10 and 17. The structure of clamp 28 is the same as clamp 27, except that a rod 43 (corresponding to rod 33) does not necessarily have a center bore and is, in fact, the piston rod of a fluid-actuated cylinder 44. This cylinder is fixed to the slide plate 40 (FIGURE 1) which has an opening to accommodate the horizontal reciprocal movement of the rod 43.

Operation

Figure 8:
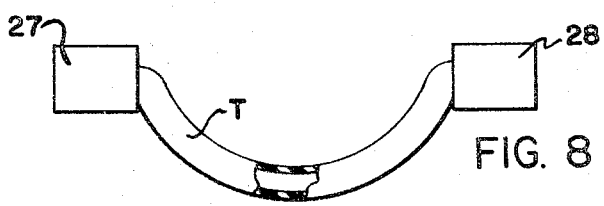
FIGURES 8 and 9 are diagrammatic illustrations of the effect of relatively moving the end clamps to reduce the gauge of a gripped tube.

In operation, with the mold sections in separated open position, cylinder 44 which is conventionally operated as by compressed air moves clamp 28 toward clamp 27 so that the clamps are a distance apart which is no greater than the length of the tube T of raw stock which is to be processed. An operator backs-off the sleeve 36 of each clamp, fits a tube end over the nose N, and allows the sleeve to return so that the tube ends are tightly gripped. FIGURE 8 diagrammatically illustrates the relative positions of the clamp and tube at this time.

Figure 9:
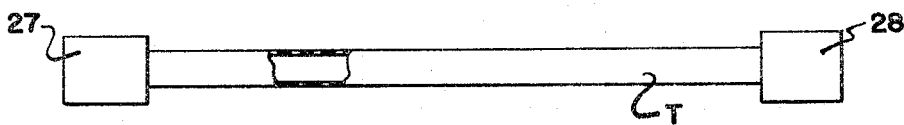

Cylinder 44 now retracts clamp 28 bringing the tube T into linear alignment and preferably also tensioning and/or stretching the tube to decrease the wall thickness of the nongripped parts. FIGURE 9 illustrates the relative positions of the clamp and tube at this time. It will be noted that the wall of the tube T in FIGURE 9 has a smaller thickness than in FIGURE 8. However, the thickness or gauge of the ends of the tube within the grip of the clamps 27 and 28 is not substantially changed. The stroke of the cylinder 44 is adjusted to place the clamps 27 and 28 beyond the area of movement of the bedplate 17 and preferably just beyond that area so that most of the tube T is within the stroke area of that bedplate.

The cylinders 15 and 16, which may be conventionally hydraulically operated, now lift the bedplate 17. There is no vertical movement of the clamps 27 and 28 until the pins 31 of the lower bedplate 17 reach the upper ends of the lower slots in the slide plates 29 and 40 as viewed in FIGURE 1. Thereafter, the clamps are lifted vertically also and continue to rise until the pins 31 of the upper bedplate 10 reach the lower ends of the upper slots in the slide plates 29 and 40 as viewed in FIGURE 1. At this time the mold sections have closed about the tube T and the clamps and attendant apparatus are in operative molding position. Air under pressure is next conventionally admitted through a conduit 45 and through the bore 34 of the rod 33 in clamp 27 to expand the tube T against the walls of the mold as defined by the encompassing segments 25. Thereafter, cylinders 15 and 16 lower the bedplate 17 and clamps 27 and 28 in reverse order to that described until the starting positions are reached. The operator may then remove the molded tube from the clamps.

In the case of molding a heat-curable material, such as vulcanizable rubber, the above operation usually does not set the material, since the operation is substantially "cold" and may last only three to seven seconds. If desired, heating means can be stationed about the molds to cure the material simultaneously with the passing operation, the mold remaining closed during this time. This technique, however, ties up the molding equipment and accordingly it is much preferred to cure the material externally of the molding apparatus.

Figure 6:
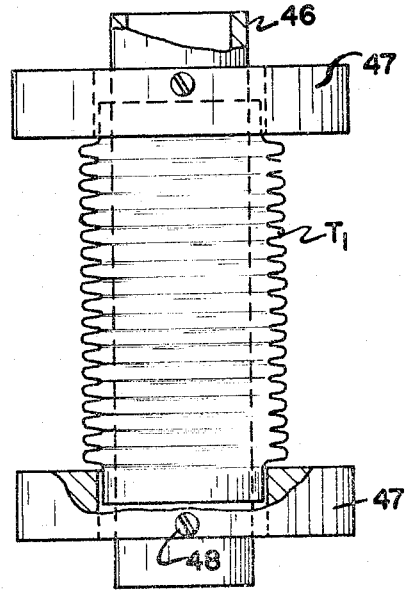
FIGURE 6 is a side elevational view of a tube shaped in accordance with the present invention and ready for curing.
Figure 7:
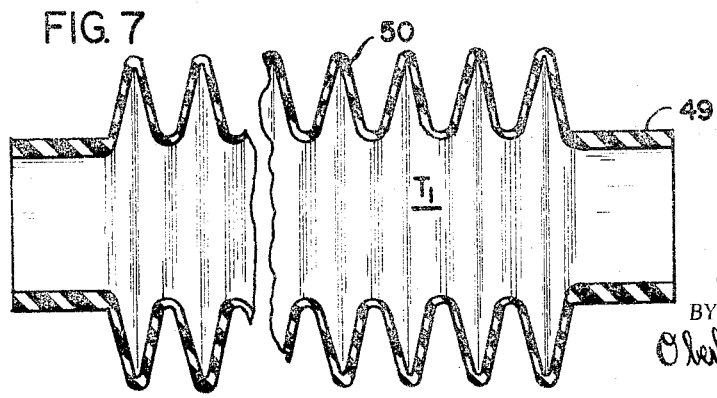
FIGURE 7 is a longitudinal section of the tube of FIGURE 6 after cure.

For example, in the case of making a corrugated tube, after removal from the mold the substantially uncured tube is axially compressed accordion fashion along the creases imparted by the molding operation and then cured while held in this compressed state. In one embodiment, the molded tube $T_1$ is placed about a short mandrel 46 for the first time and held in an axially compressed state by rings 47 abutting the ends of the tube and fixed to the mandrel by set screws 48 (FIGURE 6). This assembly is placed in an oven, autoclave, or the like and heated to set the material such as by vulcanization. After removal from the oven, the tube $T_1$ is elastic and easily retains its shape. No trimming is necessary. Such a cured product is illustrated by FIGURE 7 which also shows the end terminals 49 having a thicker gauge than that of a medial portion 50 of the tube. In one instance, a tube of predetermined length produced by this invention weighed 26 percent less than a tube of equal length and composed of the same material but produced by prior art techniques.

Also the clamp 27 has been described as stationary (except for vertical movement) and in the embodiment described is, in fact, stationary for a given operation. Clamp 27 is nonetheless capable of being adjusted in a horizontal direction along the bedplates 10 and 17. It is necessary only to relocate the pins 31 as desired, the pins being threaded and engaging selectively suitably threaded openings along the edges of the bedplates. To illustrate this, clamp 27 and slide plate 29 have been located inwardly from the left-hand end of the apparatus as viewed in FIGURE 1. Thus, quite independently of any limiting mandrel size, a large variety of tubular sections differing in length and diameter may be processed by the same versatile apparatus.

Other forms embodying the features of the invention may be employed, change being made as regards the features herein disclosed, provided those stated by any of the following claims or the equivalent of such features be employed.

We therefore particularly point out and distinctly claim as our invention:

1. A method comprising stretching an intermediate portion of a tube of uncured rubber to reduce its gauge while retaining the gauge of the tube terminals substantially the same, subjecting the stretched intermediate portion to a molding operation to form axially-spaced circumferential creases, axially compressing the tubing accordion fashion, and curing the rubber while the tube is in the compressed state.

2. A method comprising tensioning an intermediate portion of a tube of uncured rubber, encasing the tensioned intermediate portion with complementary corrugated mold sections, expanding the intermediate portion in the mold sections to reduce the gauge thereof while retaining the gauge of the non-tensioned portions of the tube substantially the same, such expansion of the tensioned portion in the mold forming thereon axially-spaced circumferential creases, axially compressing the tube accordion fashion, and curing the rubber while the tube is in the axially compressed state.

3. A method of making an elastic corrugated hose comprising the steps of gripping the ends of a generally tubular section of vulcanizable rubber while leaving substantially the balance thereof unsupported, moving the gripped ends relatively away from each other in a substantially axial direction to tension such unsupported balance, placing a mold having a corrugated wall about the tensioned portion and between the gripped ends while maintaining tension on said section, admitting pressure fluid into the tensioned portion to force the sides thereof against the mold and thereby form precreases thereon according to the corrugations of said mold, the thickness of a wall of said unsupported balance of the section being decreased following said gripping step by at least one of said shaping steps while retaining substantially the thickness of the gripped ends, removing said section from said mold and releasing the tension thereon, disposing said section on an axial mandrel, axially compressing the tubular section until said precreases are in close uniform proximity, said mandrel being dimensioned to prevent said tubular section from deforming off the axis of said mandrel and, curing said section while so axially compressed to impart elasticity thereto and render the creases permanent.

4. The process of claim 3 wherein said tensioning and molding steps are carried out at time and temperature conditions insufficient to vulcanize said rubber tube.

References Cited
UNITED STATES PATENTS

| | | | |
|---|---|---|---|
| 830,204 | 9/1906 | Boyle | 264—94 |
| 2,248,898 | 7/1941 | Ross. | |
| 2,347,086 | 4/1944 | Curtiss | 18—198 |
| 2,897,840 | 8/1959 | Roberts. | |
| 2,967,563 | 1/1961 | Huff | 264—94 |
| 2,983,961 | 5/1961 | Titterton. | |
| 2,999,272 | 9/1961 | Warnken | 18—198 |
| 3,019,820 | 2/1962 | Yowell | 138—121 |
| 3,050,087 | 8/1962 | Chaplan | 138—121 |
| 3,050,786 | 8/1962 | St. John | 264—94 |

ROBERT F. WHITE, *Primary Examiner.*

ALEXANDER H. BRODMERKEL, *Examiner.*

R. B. MOFFITT, *Assistant Examiner.*